US012689864B1

(12) United States Patent
    Read et al.

(10) Patent No.: US 12,689,864 B1
(45) Date of Patent: Jul. 21, 2026

(54) PHASELESS UPMIXER SYSTEM

(71) Applicant: Perfect Surround UK Limited, Los Altos, CA (US)

(72) Inventors: Jeffrey Read, San Francisco, CA (US); Andrew Wehmeyer, Pasadena, CA (US)

( * ) Notice: Subject to any disclaimer, the term of this patent is extended or adjusted under 35 U.S.C. 154(b) by 0 days.

(21) Appl. No.: 15/682,532

(22) Filed: Aug. 21, 2017

Related U.S. Application Data

(60) Provisional application No. 62/533,660, filed on Jul. 17, 2017, provisional application No. 62/377,588, filed on Aug. 20, 2016.

(51) Int. Cl.
    *H04S 3/00* (2006.01)
    *G06F 3/16* (2006.01)
    *H04R 5/02* (2006.01)
    *H04R 5/04* (2006.01)
    *H04S 7/00* (2006.01)
    *H04R 3/04* (2006.01)

(52) U.S. Cl.
    CPC .............. *H04S 7/303* (2013.01); *H04R 5/02* (2013.01); *H04R 5/04* (2013.01); *H04S 3/008* (2013.01); *G06F 3/165* (2013.01); *H04R 3/04* (2013.01); *H04R 2499/13* (2013.01); *H04S 2400/01* (2013.01)

(58) Field of Classification Search
    CPC . H04S 7/30; H04S 7/301; H04S 7/302; H04S 7/303; H04S 7/305; H04S 7/307; H04S 7/308; H04S 7/40; H04S 3/008; H04S 3/16; H04S 3/162; H04S 3/165; H04S 3/167; H04S 2400/01; H04S 2400/05; H04S 2400/07; H04S 7/00; H04S 3/00; H04S 3/02; H04S 3/004; H04S 5/005; H04R 3/04; H04R 3/06; H04R 3/08; H04R 3/12; H04R 3/14; H04R 5/02; H04R 5/023; H04R 5/04; H04R 2499/13; H04R 5/00; H04R 27/00; G06F 3/165; G06F 3/16; G06F 3/162; G06F 3/167; G10L 19/008
    USPC ....... 381/300, 302, 303, 304, 305, 306, 307, 381/27, 71.4, 86, 365, 389, 61, 119, 109, 381/107, 103, 59; 340/4.14, 4.37, 4.44, 340/41, 4.42; 701/419, 418, 428, 431, 701/432, 441, 211; 700/94
    See application file for complete search history.

(56) References Cited

U.S. PATENT DOCUMENTS

2003/0219137 A1* 11/2003 Fincham ................. H04S 1/002
                                                        381/302
2007/0183608 A1* 8/2007 Willems ................... H04R 3/12
                                                        381/307
2008/0319564 A1* 12/2008 Furge ....................... H03G 3/32
                                                        381/86

(Continued)

*Primary Examiner* — Leshui Zhang

(57) ABSTRACT

This sound processing system creates surround effects by minimizing quality degradation experienced by known sound processing systems in non-optimum listening environments such as vehicles. The sound processing system may include taking two channel input stereo signals and upmixing the input signals into at least two output signals where the phase of the output signals remains unchanged from the input signals. Once the output signals are generated by the upmixer, all pass filters can be adjusted based on the distance of the listeners from the loudspeakers to obtain the desired all pass filter frequencies and Q values.

7 Claims, 8 Drawing Sheets

(56) References Cited

U.S. PATENT DOCUMENTS

| | | | | |
|---|---|---|---|---|
| 2014/0334637 A1* | 11/2014 | Oswald | ...................... | H04S 7/30 |
| | | | | 381/86 |
| 2016/0232901 A1* | 8/2016 | Ghido | ................... | G10L 19/008 |
| 2017/0064445 A1* | 3/2017 | Pierfelice | ................ | H04R 3/04 |

* cited by examiner

2017 Porsche 911s

1977 Porshe 911

PHASELESS UPMIXER SYSTEM

CLAIM OF PRIORITY

This application claims priority to U.S. Provisional Patent Application No. 62/377,588 filed on Aug. 20, 2016 titled "Automotive Sound Optimization System for Vehicles" and U.S. Provisional Patent Application No. 62/533,660 filed on Jul. 26, 2017, titled "Phaseless Upmixer System" both of which are incorporated by reference in their entirety.

BACKGROUND OF THE INVENTION

Field of the Invention

The invention generally relates to tuning sound in automobiles. Specifically, the invention relates to the ability to tune any multi-track sound channels to optimize the sound field for any car or automotive car speaker configuration.

Related Art

Consumer expectations of sound quality in audio or sound systems are increasing in sophistication and demand for high quality audio, especially in environments in which the listener's proximity to the speakers and to reflective surfaces make the creation of a high quality listening experience difficult. These difficult environments exist in the interior driver and passenger compartments of vehicles. In addition, the number of potential audio sources has increased. Audio is available from sources such as radios (e.g., AM and FM signals), compact disc ("CD") players, digital video disc ("DVD") players, super audio compact disc ("SACD") players, internet radio players, MP3 players, and the like.

Since the advent of the automobile, car seating positions have been fixed and arranged around the location of the driver. The driver is most often the owner, and the one for whom all of the controls and interfaces have been designed. Generally, all passengers sit in one enclosure together with no acoustic barriers between them. Over time, this focus on the driver has dramatically increased as more features and technologies have been added to automobiles. As shown in FIG. 1, in just 40 years the number of controls oriented to the driver of a Porsche 911 has increased ten-fold.

Automated or self-driving cars have the potential to completely upend this paradigm. No longer will the seats, controls, feedback devices and entertainment systems need to be configured around a necessary driver's position. This has the potential to turn every automobile into a "pod" in which many activities are possible. Future car interiors will be designed to be easily re-configurable for different activities—shared or singular—or designed to provide the best possible experience for the owner's preferred activity.

Initially, as countries transition to self-driving cars, there are still going to be legal requirements to include a driver's seat. However, this may only be an intermediate step. New, exciting and radical seating layouts are likely imminent. These include scenarios where the orientation of passengers is facing backwards or sideways, or sitting around a common theme-based entertainment or working area. This new reality will make the need for high quality sound in each seating location even more critical.

No one seems to know exactly what will happen, but two dramatically different directions for self-driving car ownership are apparent. In the first, the current vehicle ownership model remains intact and car interiors will become easily reconfigurable for different activities. An alternate scenario could favor specialization rather than configurability, with the cost of that specialization borne by renters of the car when not in use by the owner.

Traditional vehicle ownership has focused mainly on the convenience of having a car waiting outside that the owner to use it at will. Studies indicate that minimizing downtime is seen by automakers and car-for-hire aggregators as revenue generators. For the automakers, this is an opportunity to pay for the technology required to automate vehicles. For car-for-hire services, it is estimated that self-driving cars will free up 1.9 trillion minutes of idle time by 2030.

Automotive audio systems will need a new philosophy where, in essence, everyone in the vehicle gets their own individualized loudspeaker. In a shared car interior where everyone is doing the same thing, the loudspeakers all work to create a great audio experience for every person in the car. When one occupant does something else, that loudspeaker is no longer available for use by everyone else and the remaining loudspeakers take over.

In a two-loudspeaker stereo system, the image (sounds seeming to be located at distinct positions between the two loudspeakers) depends on precise matching of level, frequency response and arrival time of the sound from the two loudspeaker. When these are precisely matched for a single listener placed in the conventional equilateral triangle arrangement, center information seems to come from a point directly in between the two loudspeakers. Differential information seems to come from either the left or right loudspeakers. Intermediate information seems to come from points between the center image and the right and left loudspeakers. With two loudspeakers, the believability of the ambience (sense of the original recording space) depends on the similarity of the size of the listening room to the size of the original recording space.

This presents a problem for listening spaces in which more than one listener will be present or in areas that are much smaller than the original recording space. Multichannel soundtracks for movies are designed to enhance believability for many seating positions in a theater. Multichannel systems can enhance imaging and ambience in other listening spaces, too, and are especially well-suited to automobile interiors.

Car interiors present two main detriments to believability of sound integrity. The offset listener position of all occupants results in poor stereo performance for all. Good stereo performance for one listener is possible if delays are used to compensate for arrival times, but delays optimized for one seat provide even poorer performance in the other listening positions. Phase equalization can be effective in improving the performance of the system for the two front seat passengers, but that solution relies on offset symmetry, which may not be available in new vehicle interior configurations.

High performance automotive audio is currently accomplished using two primary techniques; tuning stereo using delays and level adjustments optimized for the driver, or stereo is up-mixed to spatial (surround) sound using a phase-based upmixer to improve the performance for all passenger positions.

Phase-based upmixers were originally developed for movie playback of encoded movie soundtracks. They use signal steering for the front channels and some decorrelation techniques for rear and side loudspeakers. Their limitations—which are often tonal coloration and level changes that are dependent on a steering algorithm—suffer a fatal flaw in the playback of non-encoded material. They cannot adequately resolve a simultaneous constant mono signal and a transient steered signal.

Steering also limits the ability for the audio to sound great in all seating locations. The turning on and off of rear loudspeakers when there is no out-of-phase information to be steered rear or when center takes priority is a common complaint for music playback in cars, especially for rear seat passengers.

This approach has been maligned by audio purists for years for magnitude response coloration, "phasi-ness" and unexpected artifacts which are common in playback of data-compressed files in which the phase relationship between left and right is poorly preserved. These artifacts are most prevalent in rear and side channels.

To improve this poor performance, several upmixers include some right and left components in the sides and rears to mask the artifacts. While this reduces complaints from rear seat passengers, it degrades the performance in the front seats because right and left components in the side loudspeakers and rear loudspeakers is a step backwards to the days of simple stereo in all four corners.

Because upmixing was originally designed to decode encoded spatial signals much of the material played back in cars doesn't include encoded rear channels. That leaves what happens in the side and rear loudspeakers to chance. For example; studio recordings in which rooms are synthesized, or in which the engineer adds a right signal to the left channel attenuated and out of phase in an effort to increase width, or when a delay is added to one channel of a mono signal to make it appear to come from both left and right loudspeakers rather than the center channel, are sometimes erroneously steered to the rear.

Sound systems have traditionally supported two-channel stereo formats. Today, many sound systems include surround processing systems that create a perception that sound is coming from all directions around a listener or set of listeners thus creating a "surround effect." Such surround sound systems may support a variety of audio formats using two discrete channel inputs such as from traditional two channel stereo input signals from which a multi-channel surround system may be created. Creation of surround effects in a wide variety of listening environments requires consideration of a different set of variables depending on the listening environment.

Surround sound systems generally use three, five, seven, or more loudspeakers that reproduce sound from two or more discrete channels to create the surround effect. Successful development of the surround effect involves creating a sense of envelopment and spaciousness. Such a sense of envelopment and spaciousness, while very complex, generally depends on the spatial properties of the background stream of the sound being reproduced. Reflective surfaces, so long they are located far enough away from the listener, aid the sense of envelopment and spaciousness in the listening environment because reflective surfaces redirect impacting sound back towards the listener. The listener may perceive this redirected sound as originating from the reflective surface or surfaces, thus the perception that the sound is coming from all around the listener is enhanced. Reflections from these surfaces are used by the listener's brain and auditory system to determine the size and shape of the listening environment.

Many digital sound processing formats support direct encoding and playback of sounds using multi-channel surround processing systems. Some multi-channel surround processing systems have five or more channels, where each channel carries a signal for conversion into sound waves by one or more loudspeakers. Other channels, such as a separate band limited low frequency channel, also may be included. A common multi-channel surround processing format (referred to as a "5.1 system" or a "7.1 system") uses five discrete channels and an additional band limited low frequency channel that generally is reserved for low frequency effects ("LFE"). Recordings made for reproduction by 5.1/7.1 systems may be processed with the assumption that the listener is located at the center of an array of loudspeakers that includes three loud speakers in front of the listener and two loudspeakers located somewhere between and including the sides of the listener and about 45 degrees behind the listener. In five channel multi-channel surround systems, both the channels and the signals carried by the channels may be referred to as left-front ("LF"), center ("CTR"), and right-front ("RF"), left-surround ("LSur"), and right-surround ("RSur"). When seven channels are implemented, LSur and RSur may be replaced by left-side ("LS"), right-side ("RS"), left-rear ("LR") and right-rear ("RR").

The physical properties of a listening environment and/or the manner in which a listening environment will be used dictate the factors that need to be considered when optimizing automotive sound systems. Most automotive sound systems are designed for optimum listening environments. Optimum listening environments generally are reverberant (sound from reflecting surfaces arrives late enough to describe a listening environment similar enough to the listening environment intended by the recording engineer to be described as "believable"), and center the listener among an array of loudspeakers, facing forward in a position known as the "sweet spot." However, the physical properties of non-optimum listening environments can be very different and generally require that additional factors be considered when sound systems are designed. One example includes listening environments that are enjoyed simultaneously by more than one listener, none of whom may be stationary or located in the "sweet spot." Another example includes listening environments that are quite small. In those environments, reflected energy arrives too soon to describe a listening environment similar to the one intended by the recording engineer. Such listening environments present a challenge in creating the surround effect. In yet a further example, the listening environment may be such that the listener or listeners are located near one or more of the loudspeakers. Most surround sound systems were simply not designed with these factors in mind.

A vehicle is an example of a non-optimum listening environment in which listener placement, loudspeakers placement and lack of an inherent reverberant field (reflected energy arrives at the listener to quickly for the listener to perceive the intended recording space), are important factors in the design of surround sound systems for that listening environment. In addition, the loudspeakers may be in relatively close proximity to the listeners and there may be less freedom with regard to loudspeaker placement in relation to the listener. In fact, it may be nearly impossible to place each loudspeaker the same distance from any of the listeners. For example, in an automobile, every seating position is located in such a way that the speakers cannot be mounted equidistant from any possible location for front right and left speakers—a requirement for adequate stereo reproduction in a 2-channel system. In addition, the size of the potential speaker mounting locations limits the potential low frequency reproduction possibility for speakers mounted in many locations. For example, the size of the center loudspeaker is limited due to the space constraints within the dashboard, which is shared by many other components providing useful information such as vehicle control feedback, climate control system, vehicle maintenance systems and infotainment systems. The placement and size restrictions are problematic because they reduce the potential for creating an illusion that all of the instruments are located on an imaginary stage in the front of the car. Size constraints also limit the amount of bass that front speakers can reproduce. The illusion that vocalists and instruments are placed appropriately from right to left across the stage is compromised by the listener's closer proximity to one of the front speakers than the other. Due to these factors, multi-channel automotive sound optimization systems suffer serious quality degradation when implemented in non-optimum listening environments. Thus, a need exists to tune a multi-channel outputs for each car to address both the lack of a reverberant field inside a vehicle and the non-optimum placement of listeners and speakers.

In the automobile of the future, the rear seats may no longer be secondary listening positions. Therefore, current matrix-based up-mixers will be insufficient as the importance of audio performance in all seats becomes paramount. Add in the need for a passenger to sit anywhere and it's easy to see how these traditional approaches are limited and will not be able to support more complex or reconfigurable seating layouts.

Self-driving cars will require a new approach to create an atmosphere where sound is optimized for all passengers, regardless of their physical location in the vehicle. Thus a need exists for an upmixer that can handle the demands of this new operating environment.

SUMMARY

This invention is a phaseless upmixer system capable of generating spatial sound, one that is phaseless and enables an immersive sound experience for car interior configurations in the future. The ability to generate a fully discrete center channel that appears before the listener independent of the location of the listener relative to the loudspeakers can be achieved with a phaseless upmixer. This will give vehicle occupants the analogous of having their own loudspeaker which may be critical to accommodate new interior layouts so that any sound system can be reconfigured as quickly as the interior of the vehicle.

A key differentiator for luxury vehicles will be that the overhead loudspeaker is rarely used. Upmixing settings will be default 7.1 and the center image will appear in the front center of the car for all passengers.

In this arrangement, if any of the occupants choose an isolated activity, then the nearest loudspeaker becomes their loudspeaker and is "removed" from shared playback system. Any subsequent upmixed content will be spread between the other adjacent loudspeakers.

The center/"Commuter" Lane is where audio configurability will be critical—where a sound system will need to dynamically re-orient itself depending on how the 'pod' has been configured. One such layout is suggested in FIG. 4. The occupants and the seating arrangement are organized around a central table on which some shared activity takes place. The center channel signal is sent to the overhead loudspeaker, L/R are also sent to the overhead loudspeaker at −6 dB. The upmixer mode is discrete center 5.1 and LS and RS are sent to all the perimeter loudspeakers.

The automotive sound optimization system uses two or more audio channels as inputs. A graphical user interfaces allows the listener to adjust various parameters to control the way in which sound energy is distributed to the center, front right and left, side and rear speakers; to adjust the apparent room size and sense of envelopment; and to adjust the phase of the output signals to counteract the degrading effects of non-optimum speaker placement relative to the listening position and speaker size limitations. Essentially, the input two channel stereo signals can be upmixed into three, four, five or seven channel high quality surround sound, then, using the tuning tools, the surround fields can be adjusted to each unique automotive environment setup. (2) the combination of controls on the tuning panel allow those surround fields to be tuned to each unique car setup.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE DRAWINGS

The components in the figures are not necessarily to scale, emphasis being placed instead upon illustrating the principles of the invention. In the figures, like reference numerals designate corresponding parts throughout the different views.

DETAILED DESCRIPTION

The ability to upmix without phasing will, for the first time, deliver a high quality listening experience anywhere in the vehicle. It presents a new center channel extraction method and the generation of side and rear signals that is more immersive, preserves bass impact and placement and preserves phase integrity in all channels.

Stereo recordings are made up of three kinds of information: Information that is recorded the same in both the left and right channels (center information), information that is only in the right or the left channels (differential information), and information that is recorded at different levels or in different phase in the left and right channels (intermediate information).

The new system designed to accommodate future vehicle interiors should ensure that nothing is sonically added or removed from the original recording being played back in the car no matter the system configuration. Because of this sonic clarity, the reproduction is faithful to the original recording but can be optimized for the listening space and the playback system.

A phaseless upmixer works by separating these components and reproducing them in discrete (surround) channels. The result will give the listener(s) greater stage width in a more open and more believable sense of space with a stable center image and improved bass. Best of all, implementation is straightforward and predictable.

Figure 1:
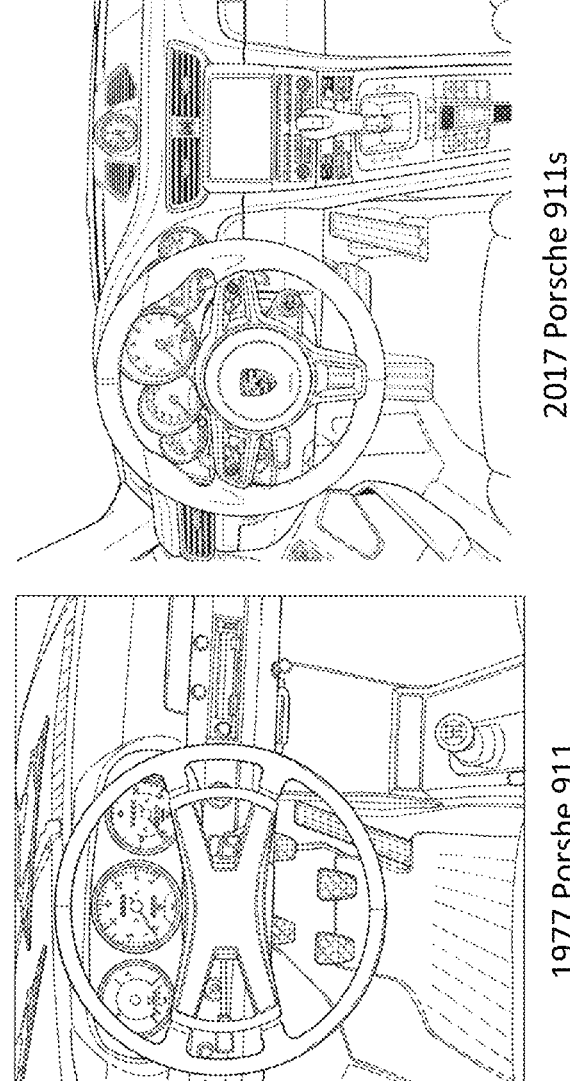
FIG. 1 are side-by-side photographs of a 1977 Porsche 911 instrument panel with a 2017 Porsche 911s instrument panel.
Figure 2:
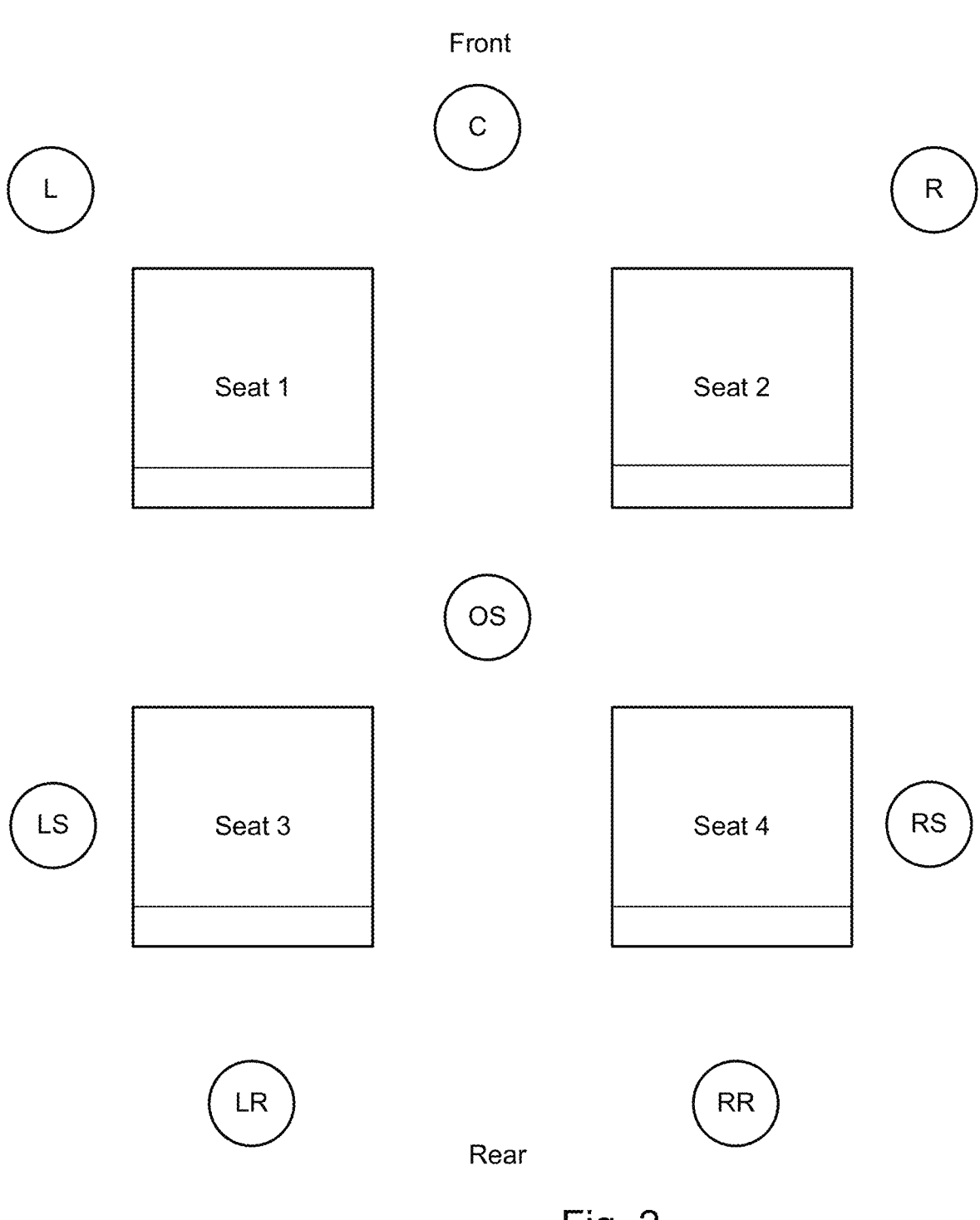
FIG. 2 is a block diagram of a loudspeaker layout in a vehicle.

FIG. 2 is a block diagram of a loudspeaker layout in a vehicle. Typically, a vehicle has two to six seats with many vehicles configured in a four seat setting such as seat 1 through seat 4. The loudspeaker configuration is usually a left "L", center "C", right "R", left side "LS", right side "RS", left rear "LR", right rear "RR" and overhead speaker "OS".

Figure 3:
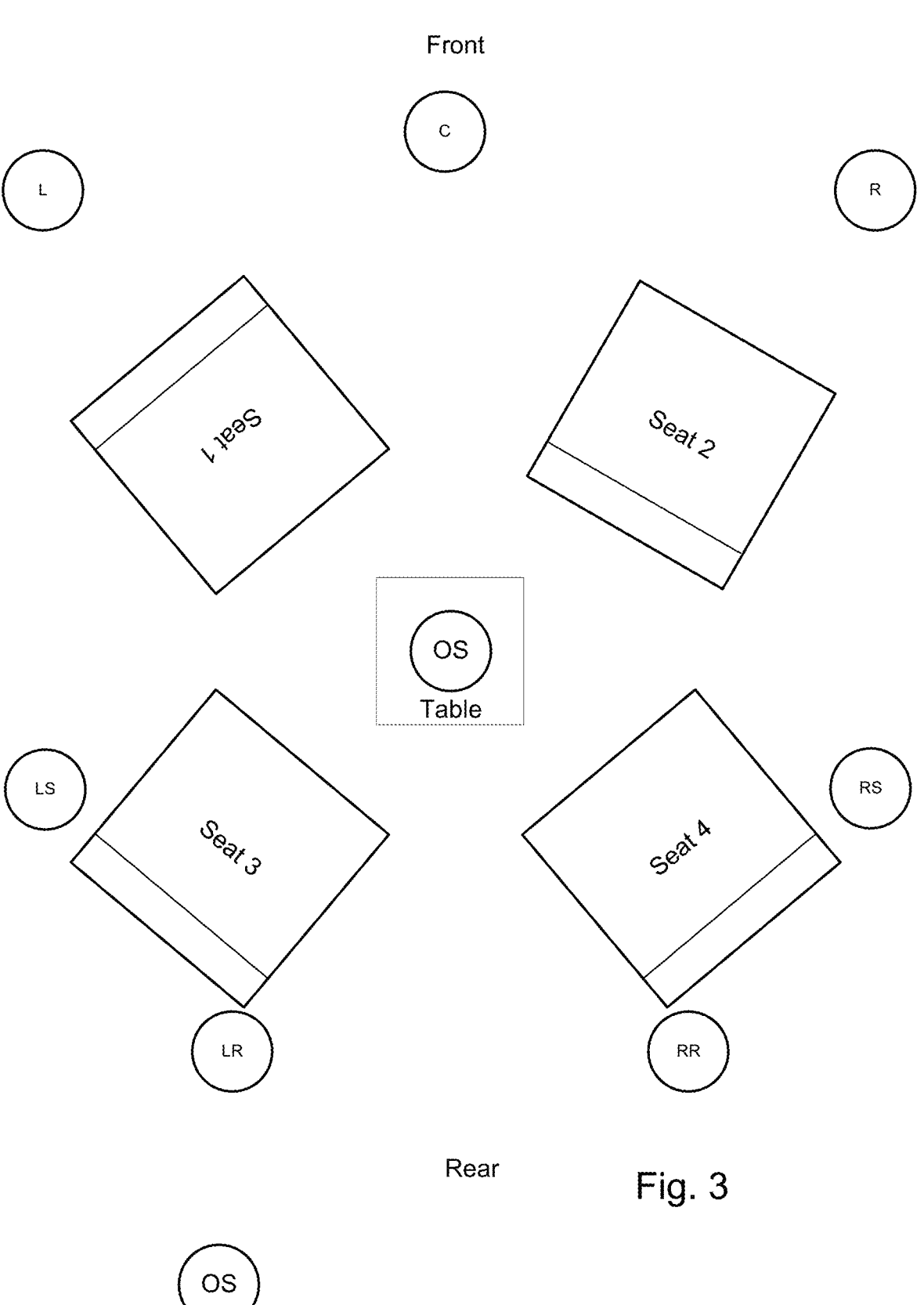
FIG. 3 is a graphical user interface in a vehicle.

FIG. 3 is a block diagram of a loudspeaker layout in a driverless vehicle. In such a configuration the seats may be configured around a table similar to the way chairs are arranged around a conference room table. Without the need for a uniform position for a driver, interior vehicle space has a lot more flexibility as to how it is configured. FIG. 3 illustrates how the upmixer in this invention will provide superior sound performance as the metrics can be modified such that each of the vehicle's seat in the newly configured, self-driving vehicle is adapted and optimized for ideal sound performance.

Mathematically, a phaseless upmixer is markedly different from phase-based matrix encoding/decoding systems, such as Dolby ProLogicII and Logic 7, which were designed primarily for movie playback. Instead of using just two sonic components (L and R), a phaseless upmixer uses three separate sonic components to build the surround field—L', R' and C'. Contained in the three input components is the Centre (C'), Differential (L', R') and Intermediate (L'–C' and R'–C').

It does not invoke any phasing in its process—this can be easily verified by taking the upmixed content and testing if it folds back 100% ITU to the original stereo. Any differential in the foldback will show that phasing is used in the process and therefore, the upmix is limited (phased-based) as well.

The phaseless upmixer has no information loss in the process where phasing does; Matrix encoding doesn't allow encoding several channels into fewer channels without losing information: one cannot fit five (5) channels into two (2) (or even three (3) channels into two (2) channels without losing sound dimension information. Worse, the decoded information is not independent. Therefore, the best a phase based upmixer is capable of is to generate a phased-based approximation of the surround sound that is acceptable. A phaseless upmixer has none of these issues—there is no information loss, each channel is independent and discrete, and this generates the highest quality upmix possible. Lastly, a phaseless upmixer does not require encoded audio data (e.g. Left/Right) to function—as it can process any stereo two-track input.

Using a traditional matrix coefficient table, written as $h_{xy}$ with x representing the column and y the row, xy is a subscript to h, and the four summations after the matrix are the mathematical constraints, the matrix is:

$$M = \begin{matrix} & L' & C' & R' \\ LR & h_{11} & h_{12} & 0 \\ LS & h_{21} & h_{22} & 0 \\ LF & h_{31} & h_{32} & 0 \\ C & 0 & h_{42} & 0 \\ RF & 0 & h_{52} & h_{53} \\ RS & 0 & h_{62} & h_{63} \\ RR & 0 & h_{72} & h_{73} \end{matrix} , \sum_{i=1}^{3} h_{i1} =$$

This matrix is phaseless for three reasons:
(i) There are eight zeros in the table. This means that no audio data or its inverse from the right input channel appears in any of the left side outputs and vice versa. The output channels are phase coherent with the differential and intermediate signals of the same side of the input spectrum.
(ii) The constraints on coefficient sums distributing the energy around the front, side and rear, which ensure that it can all collapse back to stereo perfectly. This is because the matrix coefficients are carefully chosen so that at any given point within the soundfield, the ear will combine the signals from the three sound sources (front, side and rear) with perfect phase alignment and consistent total energy as if he/she were listening to the original L' source emanating from one loudspeaker but with the added envelopment of a multiple loudspeaker system. Because there is no phase manipulation in the algorithm, the acoustic phase is dependent solely on loudspeaker placement and room reflections. Pro sound designers have described the effect of bringing a stereo sound source up into 7.1 as "like opening a Japanese fan"—all enveloping, where nothing gets lost.
(iii) There are no steering angle computations or automatic level adjustments required to overcome the stage narrowing effects of a summed (L+R) center signal and under no circumstances must the algorithm choose between center or rear priority.

This eliminated the artifacts prevalent in the side and rear channels of a matrix processor.

Once this capability has been established as the foundation of the system, determining how to optimize the sound for each seating location in a traditional system become quite straightforward. Simple distance measurements from loudspeaker locations to each seating location in the car (e.g., in this case, to the front left area of the cockpit) can generate the desired soundfield in all four seats. The front stage remains in the front of the vehicle and the experience in all four seats is like the experience in four centrally located seats in a concert hall.

Unlike a traditional stereo system that relies on a precise level and phase match to generate a phantom center image or a matrix processor that uses a summed center signal, a phaseless upmixer will extract the common center information and send it to a dedicated center loudspeaker. No matter the listener's seating position, the information that should appear in the center is sent to the center loudspeaker.

This is possible because traditional phased based upmixers derive spatial sound from two sources. The left and right signal channels are transformed into mid (M) and side (S) channels before carrying out some processing on the M/S data. M and S are linear derivations of L and R with M=L+R and S=L–R.

Phaseless upmixers take this concept much further by adding a specialized transform of both left and right channel inputs using several algorithms for both real and perceived sound components.

From the resultant frequency arrays, center channel data is derived by applying a weighting function:

$$C(\omega) = \sum_{\omega=0}^{\pi/2} W(\omega) * (L(\omega) + R(\omega))$$

The weighting function is chosen as the relative proportion of signal energy between the mid and side signals.

For shared activities in a vehicle, instead of the current 'everyone has a stage' approach, this method generates a single strong discrete center that references well throughout the car. When one or more passengers desire separate activities this method maintains the front stage/rest of the room relationship for remaining passengers even as interior reconfiguration makes the speaker nearest the passenger who wishes to engage in a separate activity unavailable for shared activity playback. Because the side and rear signals are a proportionate "spread" of left or right intermediate and differential information across three speaker locations rather than one, that proportionate spread can accommodate the removal of any speaker (except center) from the system and the proportionate spread can be applied to the remaining speakers. This property of the phaseless upmixer makes it possible to accommodate several vehicle interior configurations and combinations of shared and private activities.

This sound processing system is geared for use in vehicles and, uniquely, it uses the upmix from two channel stereo input signals into three or more (e.g. seven (7) channel surround sound) in using a high quality methodology and then, through the use of a combination of controls on a tuning panel, allows the surround fields to be optimized to unique vehicle configurations. A "+1" layer on top of the tuning panel provides a simple distance interface that greatly simplifies the tuning process. When the two channels inputs are upmixed, the surround sound system does not use phasing to create the output signals. Thus, no unwanted artifacts are created. This also creates a rich spatial control environment.

Figure 4:
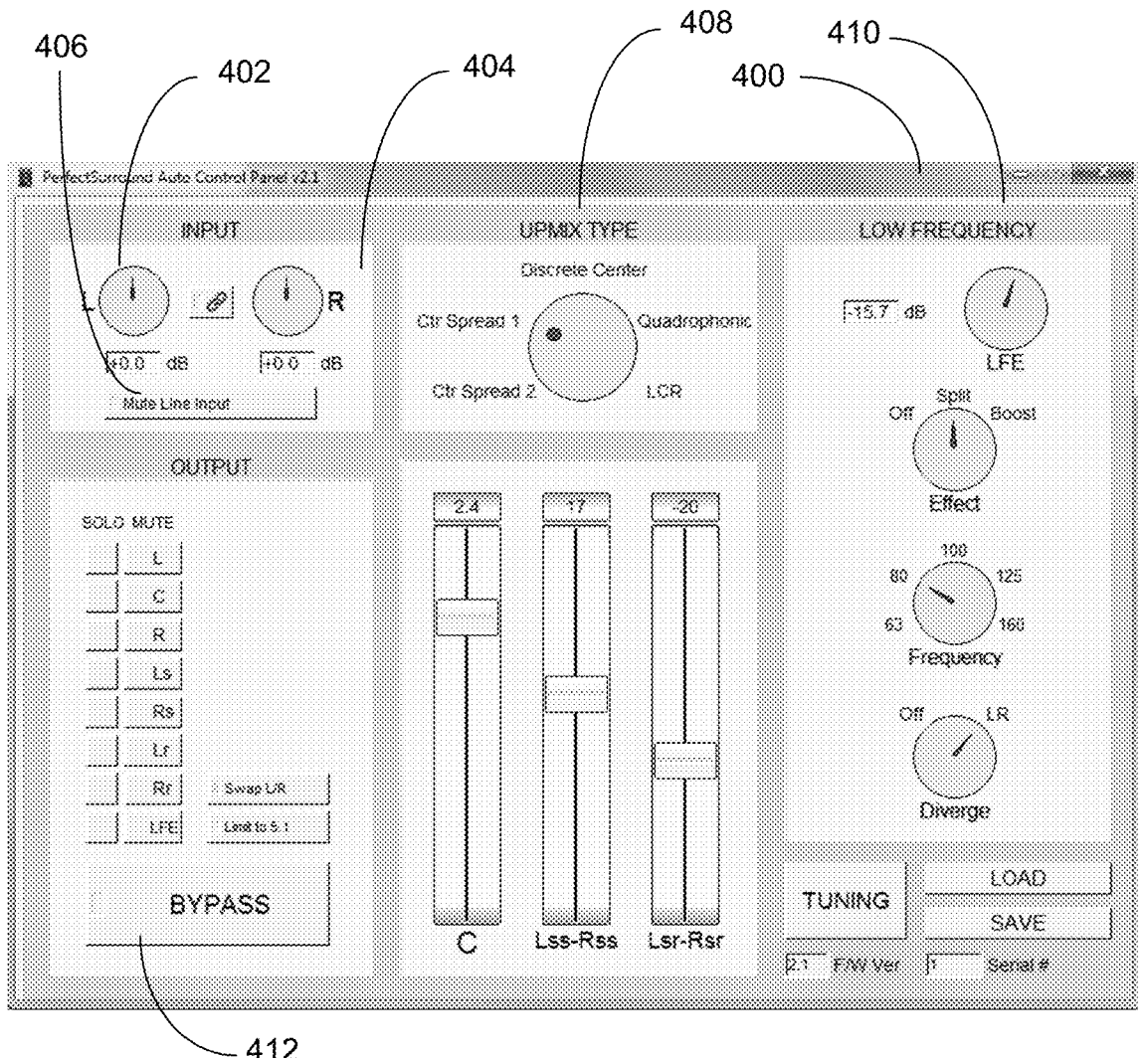
FIG. 4 is a block diagram of a distance algorithm for any seat location in a vehicle.

FIG. 4 is a graphical user interface for an upmixer for the sound processing system. The inputs 400 are shown in the graphical user interface along with the input level controls for the left 402 and right 404 input signals. A mute line input may also be provided. An upmix type control 408 may support a discrete center, quadrophonic, LCR, center spread #1 and center spread #2 or other upmix configurations. The low frequency control 410 may include a level control 410, a control for routing the low frequencies only to a separate output or also to additional channels 412, a low pass filter frequency selection 414, and a control for sending center channel low frequency energy to the left and right speakers 416. A control for resetting the setting to their default state may be included 418. Controls for saving the settings to a file located on a computer used for adjustment and recalling a file stored on such a computer may also be provided 420.

The graphical user interface may also allow a listener to mute or unmute one or more outputs 424, including the ability to swap left and right inputs to the upmixer 126, select from 5.1 or 7.1 channels 428 or to bypass processing altogether 430. Filters and balancing tools may be used for a specific vehicle and allows any vehicle to be tuned to be optimized for nearly any vehicle configuration.

Figure 5:
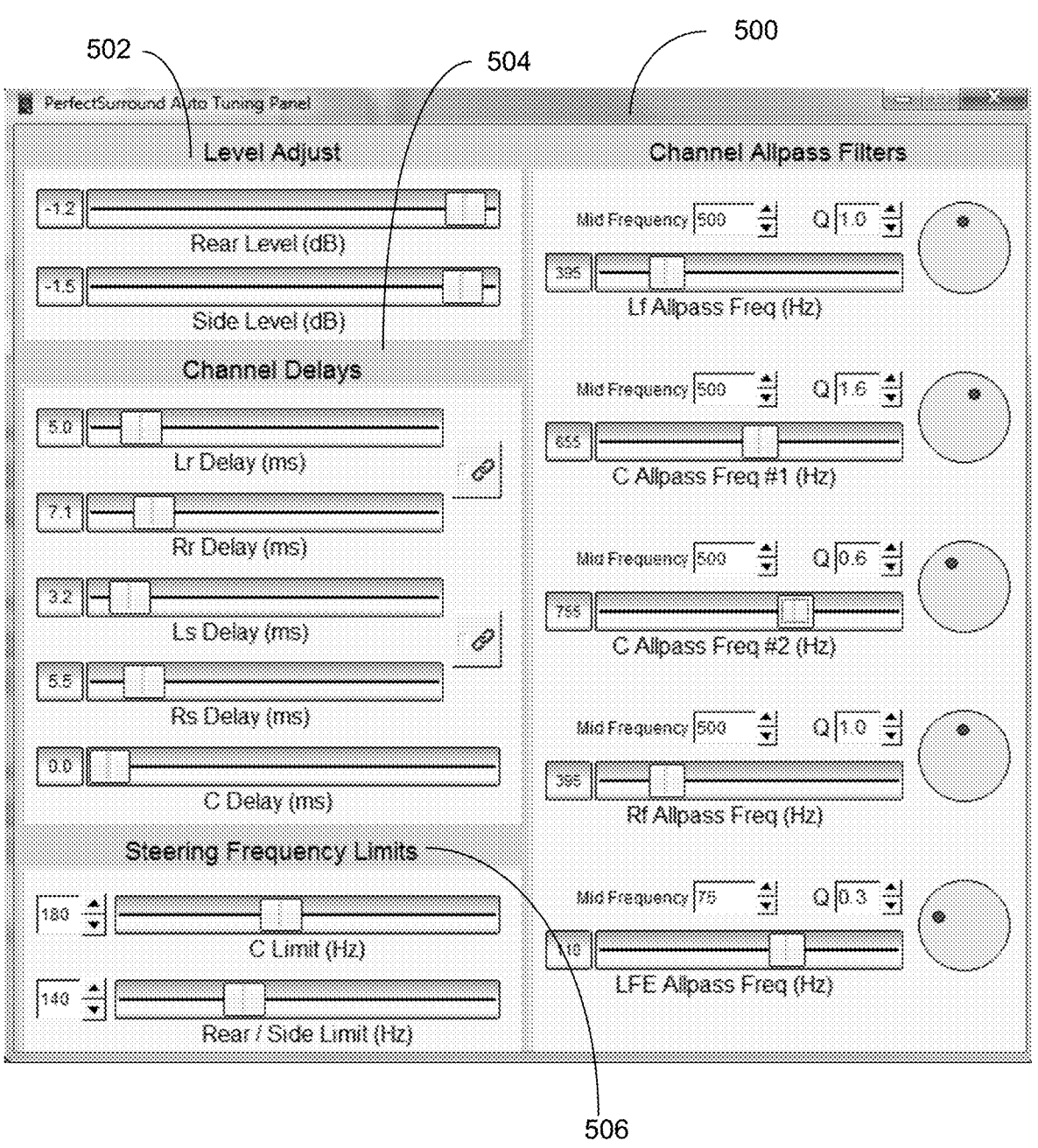
FIG. 5 is a graphical user interface for an upmixer for the sound processing system.

FIG. 5 is a graphical user interface for the sound optimization panel for the sound processing system. The optimization panel allows a listener to adjust 200 the rear and side level in dB. Channel delays 502 may also be adjusted in milliseconds for the left rear delay, left side delay, right rear delay and right side delay, and center delay. Low frequency steering limits 504 may also be set for the center, rear and side limits in Hertz. Input functions for all pass filters (phase EQ) applied to the driver's side speakers 506 and 508, to the center speaker 510 and 512 and to the LFE (subwoofer) channel 514 may also be provided.

Figure 6:
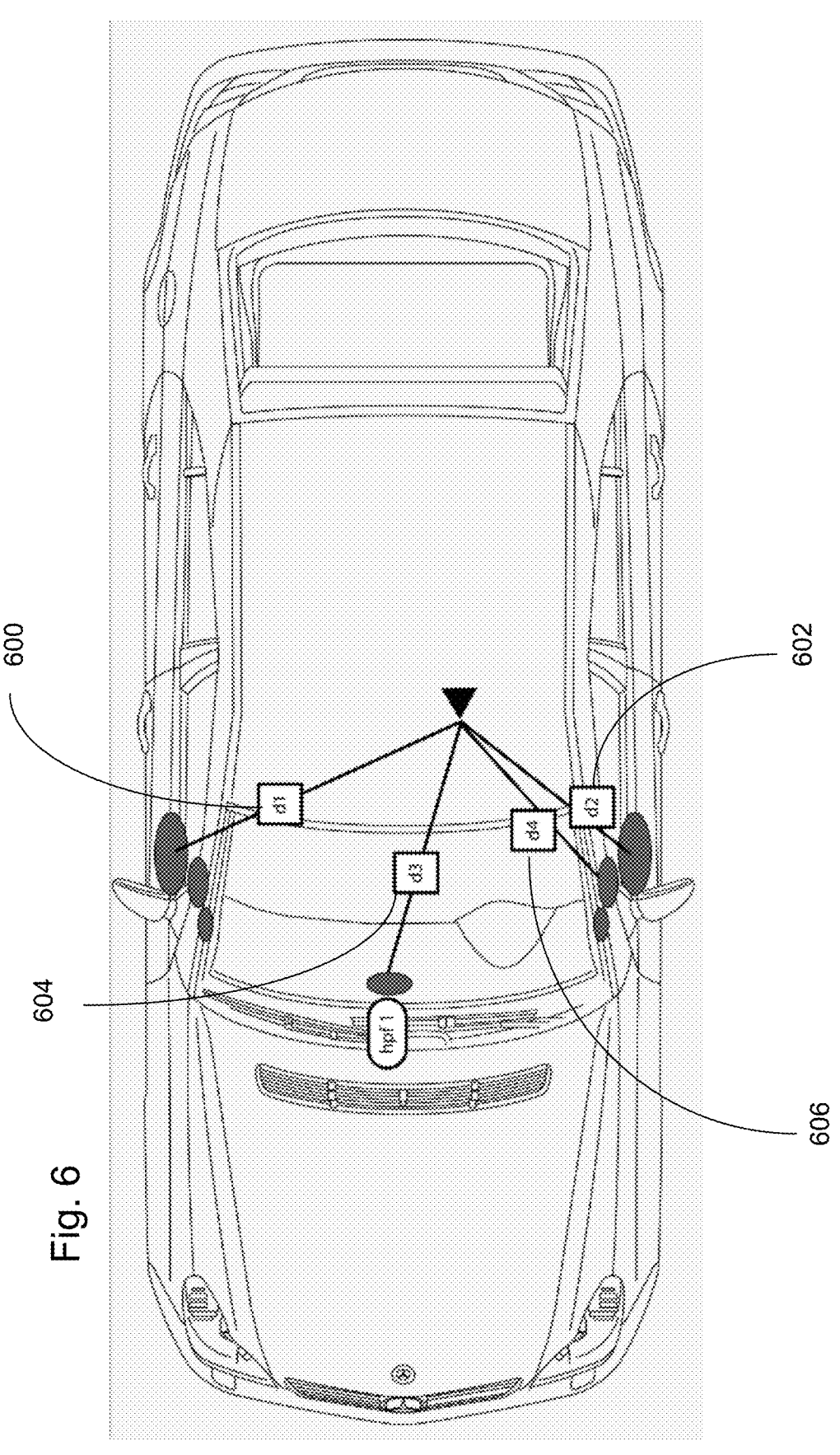
FIG. 6 is a graphical user interface for an automotive sound optimization panel.

FIG. 6 shows the Initial Setup panel and provides a simple distance input interface from which the algorithm calculates the phase EQ correction filters to be applied. A selection for measurement units 600 may be included. A selection for driver's seating position may be included 602 and will determine the channel to which the Lf all pass filters will be applied. An input for low frequency steering limits may be included 604. An option to clear all of the fields and re-input the values may be included 612. Selections that allow the user to select between a 5.1 or 7.1 upmix may exist 608 and the ability to bypass the upmixer altogether may also be included 610. Finally, boxes for inputting the required distance measurement from which the filter coefficients will be generated is included here 306.

The simple version of the setup control panel (which could be depicted in a GUI as a similar and generic car diagram with text input boxes for the user to input measured distances, or it could be a simple series of text input boxes with functions described as text rather than diagrams) is an overlay that obscures the complexity of the right side of the tuning panel. Shown in FIG. 4 is an advanced control panel. In FIG. 4 the tuning panel is shown providing user controls for the all pass filters that are used to compensate for phase differences at the listening position that are caused by the different distances from the left, right and center loudspeakers and the listening position. The result of d1-d2 (600, 602) from FIG. 6 is used to identify the primary driver's side all pass filter frequency and its associated Q value. The result of d3-d4 (604, 606) from FIG. 6 is used to identify the center all pass frequency #1 and its associated Q value. The low frequency limit chosen to protect the center loudspeaker (hpf 1) is used to determine the center all pass frequency #2 and its attendant Q value. If no center loudspeaker is present, then d3-d4 (604, 606) is not used and no filter coefficients are generated for the center channel output.

The advanced setup control panel as illustrated in FIG. 4 can be used without the simple setup control panel for users who want to fine tune or who desire to use some acoustic test equipment to identify the frequencies and Q's or for systems that do not conform to the diagram in the simple setup control panel. The simple setup control panel can be provided as the only interface for users who prefer to forego the Channel All Pass Filter section of the advanced setup control panel.

Because most seating in a vehicle is symmetrical, a listener seated in the driver's seat will be located at some distance from the driver's side front speaker and some other distance from the passenger's side speaker. A listener seated in the passenger's seat will be located the same distance from the passenger's side speaker as the driver is located from the driver's side speaker. The same symmetrical relationship exists for proximity of both front seat passengers to the center speaker. A similar relationship exists for both seating positions and the speaker located on the other side of the car. The same symmetrical relationship exists for proximity of both front seat passengers to the center speaker. Therefore, absolute value of (d1-d2) (600, 602) and (d3-d4) (604, 606) are the same for both seats. Thus, measurement for the diver is typically the same as for the passenger and the measurement for the left rear passenger is the same for the right passenger. Thus, the distances can be input into a screen and the tuning may be accomplished automatically. Correcting for phase differences between the channels and a listener seated in the driver's position will also provide improvement for phase differences that exist in the passenger's seat.

When multi-channel tracks are applied to a vehicle's audio system, the left speaker is closer to the driver than the passenger, this difference creates a phase difference by the placement of the loudspeaker and the position of the listener and this placement difference requires a phase correction which is accomplished by the system. The right half of the advanced setup control panel allows a user to make these phase changes.

FIG. 6 is a top view of a vehicle illustrating the distance input interface. The overview of the system is the artifact-less surround output taking two channel left and right stereo channels into a five or seven channels output. The surround sound system takes the two channel input signals and outputs a five or seven channel output system which can be controlled by a listener. The center channel may be synthesized from the left and right channels. The system can provide advanced channel and low frequency controls. An algorithm creates optimal sound from the phase-less input signals thus adding no unwanted sonic artifacts to the surround mix of signals. Each seating position may have immersive sound and wide separation from other channels creating a rich special control.

When placed in a vehicle, the surround sound system can adjust side levels with adjustments to the side, rear and center delays. The left front, (or right front, if the driver's position is identified as the right front seat) and center all pass filters can be adjusted. Also, the center channel low frequency cutoff filter may be adjusted. Also, an all pass filter can be applied to the low frequency effects ("LFE") or subwoofer channel. All the controls may be used together to create the impression that the bass is coming from the front of the car. Lastly, the surround sound system can be tuned for any vehicle sound configuration.

For the distance interface, the user inputs distance measurements which automatically assign the correct filter settings to the advanced tuning panel as shown in FIG. 4. The upmixer takes two channel stereo inputs (e.g., a left and right channel) to generate artifact-less surround sound output of 5.1 (5 channels) or 7.1 (7 channels) of audio output. The software breaks the two channel audio into five or seven channels which can be independently controlled. The center channel is synthesized from the two channel input by using advanced channel and low frequency controls. The optimum output sound is created from phaseless system that adds no unwanted sonic artifacts to the surround sound mix. Thus, each seating position has an immersive sound and wide separation between the channels, adjustable in the upmixer tuning control panel.

In the advanced tuning panel, the user can adjust the side, rear and center channel levels and implement delays to enhance the width of the image in the front of the car and the sense of spaciousness. Fine adjustment of the side/rear and center low frequency steering limits and the left (or right), center and LFE channel all pass filters is provided in the advanced tuning panel.

This upmixer uses the controls together to create an image that spans from far left to far right with a stable center image located midway between the left and right speakers and helps to create the impression of bass coming from the front of the car no matter the location of the subwoofer speaker. Also, this upmixer can be tuned for any conforming vehicle speaker configuration easily by inputting the distance measurements from which the algorithm computes the filter settings that appear in the advanced tuning panel. The distance measurements and the associated calculations simplify the tuning process.

Figure 7:
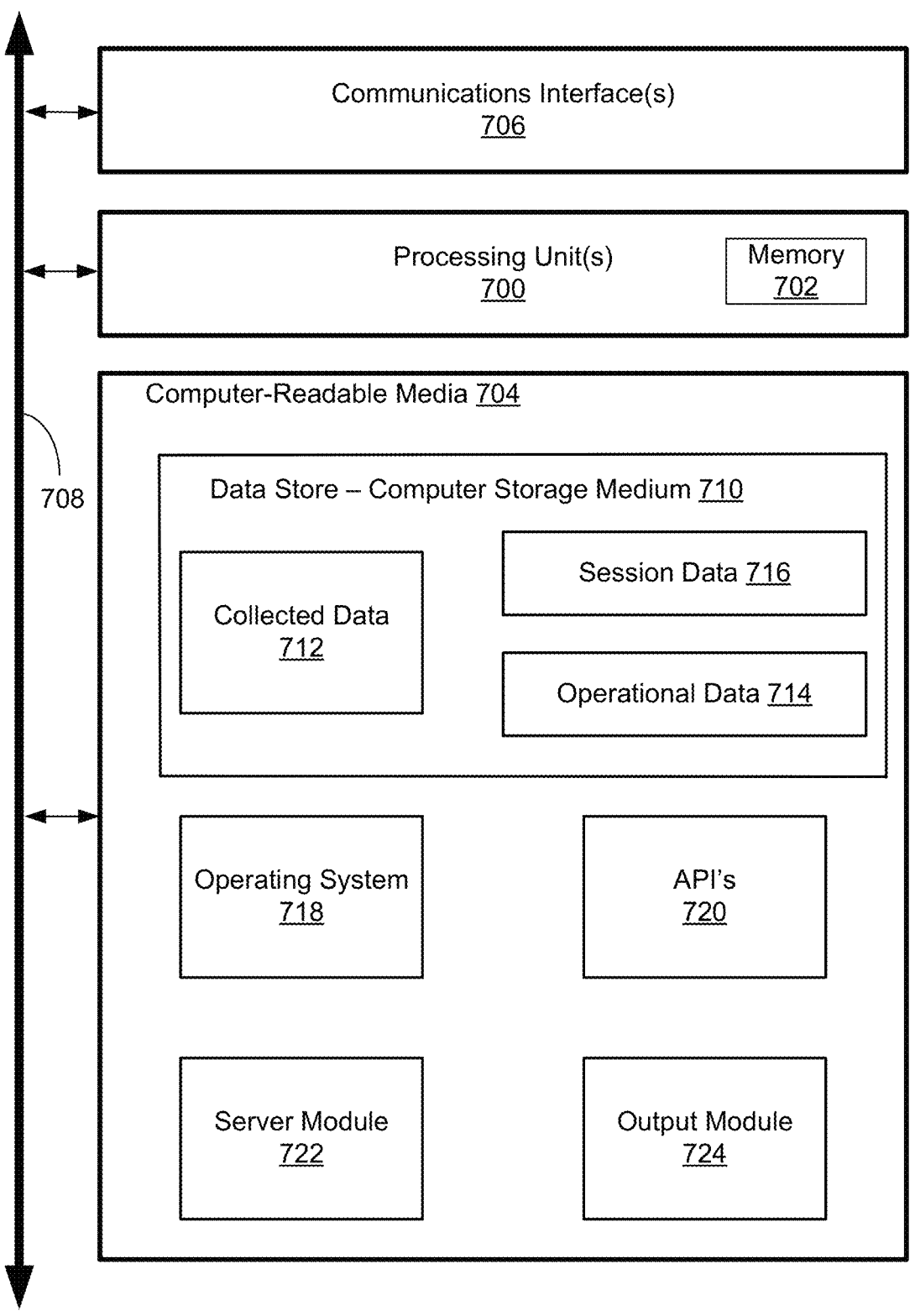
FIG. 7 is a block diagram of a distance algorithm for any seat location in a vehicle.

FIG. 7 is a block diagram of an example implementation of the upmixer system software 700 that operates on a plurality of microprocessors. In this example, the upmixer system software operates on a plurality of processing units 700 that can access memory locations 702 for storing data and further comprises components for use during operation of the software. The upmixer system software contains a controller or a computing device that further includes one or more processing units 700, one or more memory storage locations 702 for storing software and/or firmware code as well as data generated by the upmixer system software's operation, a computer-readable medium 704, and one or more communication or network interfaces 706. In this example, the one or more processing units 700, one or more memory units 702, computer-readable medium 704, and one or more communication interfaces 706 are in signal communication and operatively connected with each other via a bus signal path 708 which may include one or more system buses such as a data bus, an address bus, a PCI bus, a Mini-PCI bus, and any variety of local, peripheral, and/or independent buses.

The computer-readable medium 704 includes encoded computer-executable instructions that cause the one or more processing units 700 to generate a data store 710 from the data collected 712 from sensors, other computer-readable medium components and user input, thus generating control output signals based on the collected data 712 and session data 716 and/or operational data 714.

A computer readable signal medium may also include a propagated data signal with computer readable program code embodied in the software. For example, as used in a baseband signal or as part of a carrier wave. Such a propagated signal may take any of a variety of forms, including, but not limited to electro-magnetic, optical, or any suitable combinations. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of these technologies.

Computer program code for carrying out operations for aspects of this invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer, for example, through the Internet using an Internet Service Provider.

As utilized, the one or more processing units 700 may represent, for example, a CPU-type processing unit, a GPU-type processing unit, a field-programmable gate array ("FPGA"), digital signal processor(s) ("DSP"), or other hardware logic components that may, in some instances, be driven by a central processing unit ("CPU"). For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

The computer-readable medium 704 may store instructions executable by the one or more processing units 700. The computer-readable medium 704 may also store instructions executable by external processing units (not shown) such as by an external CPU, an external GPU, and/or executable by an external accelerator, such as an FPGA type accelerator, a DSP type accelerator, or any other internal or external accelerator. In some embodiments, at least one CPU, GPU, and/or accelerator are incorporated in the computing device, while in other embodiments, one or more of a CPU, GPU, and/or accelerator may be external to the computing device.

The computer-readable medium 704 may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media may include tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to the computer storage medium 710, communication media may embody computer-readable instructions, data structures, program modules, or other data in a modulated data signal, such as a carrier wave, or other transmission mechanism.

The one or more communication interfaces 706 may represent, for example, transceiver devices to send and receive communications over a network. In this example, the computer-readable medium 704 includes a data store 710. In some examples, the data store 710 may include data storage such as a database, data warehouse, or other type of structured or unstructured data storage for operation of computing device.

The data store 710 may store data for the operation of processes, applications, components, and/or modules stored in computer-readable medium 704, such as the purchasing system and/or executed by the one or more processing units 700 and/or accelerator(s). As an example, the data store 710 may store operational data relating to the operation of the upmixer system 714, session data such as data related to specific upmixer and related information data on the specific upmixer transactional data 716 and/or other collected data 712 that may be useful for upmixer analytics.

Alternately, some or all of the above-referenced data may be stored on the separate one or more memory units 702 on board the one or more processing units 700 such as, for example, a memory on board a CPU-type processor, a GPU-type processor, an FPGA-type accelerator, a DSP-type accelerator, and/or another accelerator. In this example, the computer-readable medium 704 also includes an operating system 718 and application programming interfaces ("APIs") 720 configured to expose the functionality and the data generated by the operation of the purchasing system to external devices associated with the computing device via the one or more communication interfaces 708.

Additionally, the computer-readable medium 704 may include one or more modules such as the server module 722, input module (not shown), and output module 724, although the number of illustrated modules is just an example, and the number may vary higher or lower. The server module 722 can act as a longer term storage medium for data collected by the purchasing system. A wireless interface can connect the purchasing system to a cloud based server system where operational, session and environmental data is stored.

That is, the functionality described in this disclosure in association with the illustrated modules in the computing device may be performed by a fewer number of modules or a larger number of modules on one device or spread across multiple devices. In this example, the output module 724 may be in signal communication with one or more output devices such as, for example, one or more displays, sound generating loud speakers or one or more mobile devices that allow the mobile device to transmit data. Similarly, the input module may be in signal communication with one or more input devices such as, for example, a virtual or actual keyboard, mouse or joy stick controller, general pointing device, or a touch screen that accepts input commands from the customer's mobile device to respond to and input commands to the upmixer system software.

Figure 8:
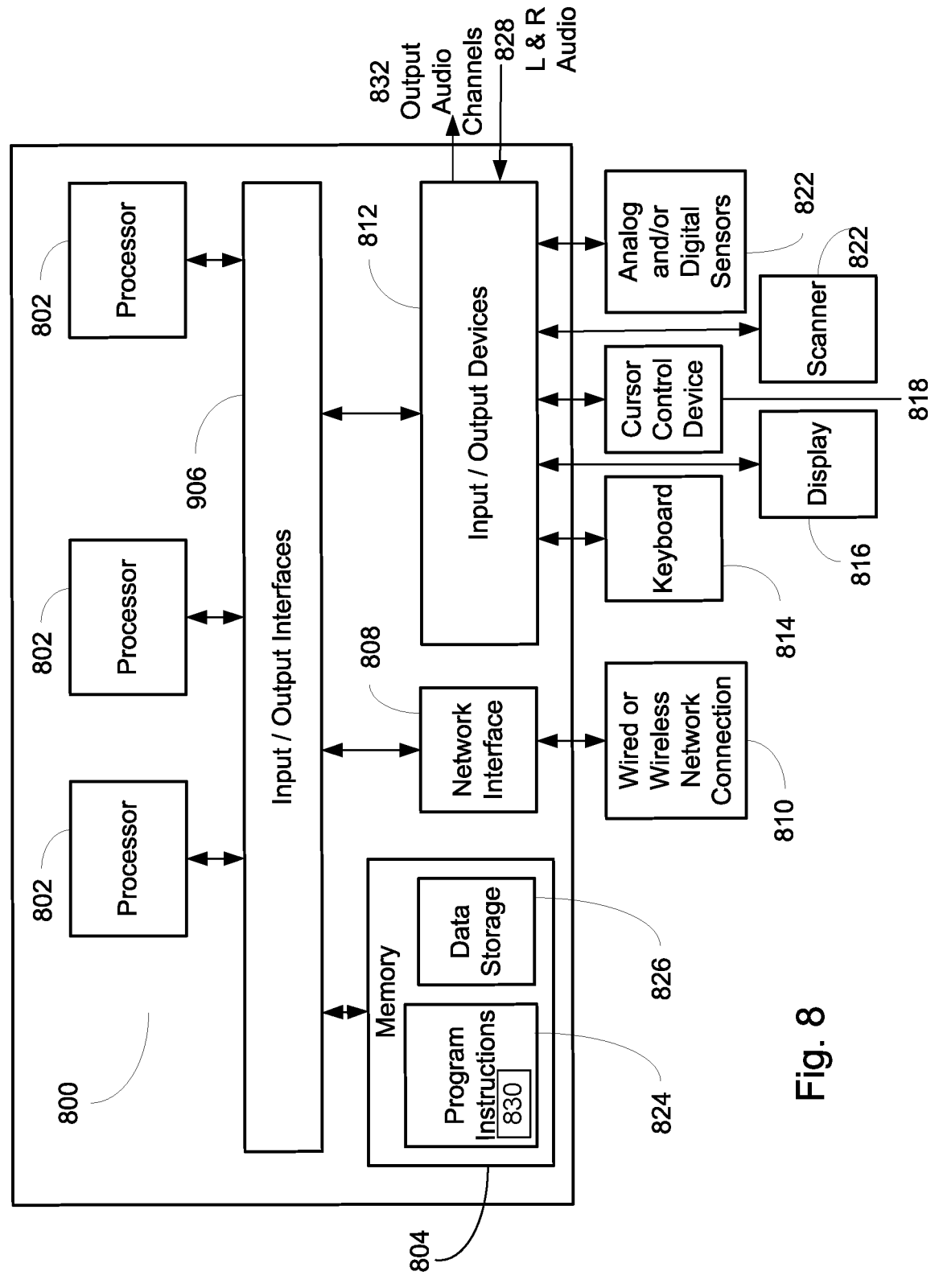
FIG. 8 is a block diagram illustrating an example of hardware used in implementing the phaseless upmixing system or module implemented in computer readable media such as software on computer hardware.

In some embodiments, the upmixer system may be performed and implemented based on input of software instructions executed on at least one microprocessor such as on the computer system is illustrated by FIG. 8. Accordingly, in FIG. 8 a computer system that may form a network from a plurality of computer systems may be used to implement the upmixer system. Computer system 800 may be implemented at each node upmixer system including the upmixer computer.

The computer system 800 may include one or more processors or processor cores 802 that are connected to and interface with a system memory 804 via an input/output (I/O) interface 806. The computer system 800 further includes a network interface 808 coupled to I/O interface 806 and connected to a wired or wireless network connection 810. Also connected to the input/output device 806 may be one or more input/output devices 812, such as keyboard 814, display(s) 816, cursor control device 818, a scanner 820, audio device (not shown), analog and/or digital sensors 822 and/or some other device. In some embodiments, it may be contemplated that the upmixer system is implemented using a single instance of a computer system 800, while in most other embodiments, multiple computer systems 800 may be included, or multiple nodes making up the computer system 800, may be configured to host different portions or instances of the embodiments. For example, in one embodiment some elements may be implemented via one or more nodes of computer system 800 that are distinct from those nodes implementing other elements.

In some embodiments, the computer system 800 may be a uniprocessor system including only one processor 802 or processor core, or a multiprocessor system including a plurality of processors or processor cores 802. Processors 802 may be any suitable processor capable of executing instructions. For example, in some embodiments, processor(s) 802 may be general-purpose or embedded processors implementing any of a variety of instruction set architectures (ISAs), such as the x86 (e.g., x86, x86-32, x86-64, and subsequent generations), PowerPC or Power ISA architectures, Reduced Instruction Set Computer ("RISC"), Complex Instruction Set Computer ("CISC"), Scalable Processor Architecture ("SPARC"), or Microprocessor without Interlocked Pipeline Stages ("MIPS") architecture, or any other suitable ISA, including derivative versions of this list or new architectures that may displace this list. In multiprocessor systems, each of the processors 802 may commonly, but not necessarily, implement the same ISA.

System memory 804 may be configured to store program instructions and/or data accessible by the processor(s) 810. In some embodiments, the system memory 804 may be implemented using any suitable memory technology, such as static random access memory (SRAM), synchronous dynamic RAM (SDRAM), nonvolatile/flash-type memory, phase change, or any other type of memory. In the illustrated embodiment, program instructions and data implementing desired functions, such as those described for providing an upmixer system may be stored within the system memory 804, as program instructions 824 and data storage 826, respectively. In other embodiments, the program instructions and/or data may be received, sent or stored upon different types of computer-accessible media or on similar media separate from system memory 804 or the computer system 800. Generally speaking, a computer-accessible medium may include storage media or memory media such as magnetic or optical media, e.g., optical disks such as CDs, DVD-ROM or other variants coupled to the computer system 800 via the I/O interface 806. The program instructions and data stored via a computer-accessible medium may be transmitted by transmission media or signals such as electrical, electromagnetic, optical or digital signals, which may be conveyed via a communication medium such as a network and/or a wired or wireless link, such as may be implemented via network interface 808.

In one embodiment, the I/O interface 806 may be configured to coordinate I/O traffic between the processor(s) 802, the system memory 804, and any peripheral devices including network interface 808 or other peripheral interfaces, such as the input/output devices 812. In other embodiments, the I/O interface 806 may perform any necessary protocol, timing or other data transformations to convert data signals from one component (e.g., system memory 804) into a format suitable for use by another component (e.g., processor 802). In still other embodiments, the I/O interface 806 may include support for devices attached through some types of peripheral buses, such as a variant of the Peripheral Component Interconnect ("PCI") bus standard, the Universal Serial Bus ("USB") standard, or any other similar peripheral bus standard. In some embodiments, the function of the I/O interface 806 may be split into two or more separate components, such as a north bridge and a south bridge. In addition, in some embodiments some or all of the functionality of the I/O interface 806, such as an interface to system memory 804, may be incorporated directly into the processor(s) 802.

The network interface 808 may be configured to allow data to be exchanged between the computer system 800 and other devices attached to a network, such as other computer systems, or between nodes of computer system 800. In some embodiments, the network interface 808 may support communication via wired or wireless general data networks, such as any suitable type of Ethernet network, via telecommunications/telephony networks such as analog voice networks or digital fiber communications networks; via storage area networks such as Fibre Channel SANs, or via any other suitable type of network and/or protocol.

Input/output devices 812 may, in some embodiments, include one or more display terminals, keyboards, keypads, touchpads, scanning devices, voice or optical recognition devices, analog or digital sensors 822 or any other devices suitable for entering or retrieving data by one or more computer system 800. Input/Output Device 812 accepts left and right audio input 828 and outputs the mixed signals 832. Multiple input/output devices 812 may be present in the computer system 800 or may be distributed on some nodes of the computer system 800. In some embodiments, similar input/output devices may be separate from the computer system 800 and may interact with one or more nodes of the computer system 800 through a wired or wireless connection, such as over a network interface 808.

As shown in FIG. 8, the memory 804 may include program instructions 824, configured to implement embodiments providing an upmixer system and related data storage 826, comprising various data accessible by the program instructions 824. In one embodiment, the program instructions 824 may include software elements for providing the upmixer 380. The data storage 826 may include data that may be used in some of the embodiments while in other embodiments the different software elements and data may be included.

To those skilled in the art will appreciate that computer system 800 is merely illustrative and is not intended to limit the scope of a software methodology for providing an upmixer. In particular, the computer system 800 and the input/output devices 812 may include any combination of hardware or software that can perform the indicated functions, including computers, network devices, internet appliances, PDAs, wireless phones, pagers, etc. The computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while some items are illustrated as being stored in memory or in storage while being used, these items or portions of them may be transferred between memory and other storage devices for purposes of memory management and data integrity. Alternatively, in other embodiments some or all of the software components may execute in memory on another device and communicate with the illustrated computer system 800 via inter-computer communication. Some or all of the system components or data structures may also be stored (e.g., as instructions or structured data) on a computer-accessible medium or a portable article to be read by an appropriate drive. In some embodiments, instructions stored on a computer-accessible medium separate from computer system 800 may be transmitted to the computer system 800 via transmission media or signals such as electrical, electromagnetic, or digital signals, conveyed via a communication medium such as a network wired and/or wireless link. Some embodiments may further include receiving, sending or storing instructions and/or data implemented in accordance with the foregoing description upon a computer-accessible medium. Accordingly, the invention may be practiced with other computer system configurations, including derivatives of future systems to the ones described here.

While various embodiments of the invention have been described, it will be apparent to those of ordinary skill in the art that many more embodiments and implementations are possible that are within the scope of this invention.

What is claimed is:

1. A vehicle sound optimization method, comprising:

inputting two or more audio channels to a phaseless upmixing module using a phaseless upmixing matrix;

outputting output signals of more than two audio channels, where the two or more audio channels are processed by the phaseless upmixing module without any modification of the phase of the two or more audio channels;

using the phaseless upmixing module to build a surround field L', C', and R' using three sonic components that are center (C'), differential (L', R') and intermediate (L'-C' and R'-C'); and tuning the output signals of the more than two audio channels to optimize a sound field for a vehicle loudspeaker system to achieve an optimized phase alignment and consistent total energy in a vehicle having the vehicle loudspeaker system.

2. The vehicle sound optimization method of claim 1, further comprising allowing a user to input distances from a listener's position to the left and right loudspeaker by interfacing with a tuning panel where the input distances are used to provide optimization of the output signals to achieve phase equalization from the phaseless upmixing module.

3. The vehicle sound optimization method of claim 1, further comprising a setup mode that reduces complexity of setup and optimization of correction filters by allowing the user to input simple distances to define the correction filters.

4. The vehicle sound optimization method of claim 1, further comprising where the more than two output channels are phase coherent with differential and intermediate signals on a same side of an input spectrum.

5. The vehicle sound optimization method of claim 1, further comprising where there is no phase manipulation and acoustic phase is dependent upon loudspeaker placement and room reflections by using the phaseless upmixing matrix.

6. The vehicle sound optimization method of claim 1, further comprising where there are no steering angle computations by using the phaseless upmixing matrix.

7. The vehicle sound optimization method of claim 1, further comprising where there are no automatic level adjustments by using the phaseless upmixing matrix.

* * * * *